(12) United States Patent
Chen et al.

(10) Patent No.: US 11,601,923 B2
(45) Date of Patent: Mar. 7, 2023

(54) UCI TRANSMISSION METHOD AND MOBILE TERMINAL

(71) Applicant: VIVO MOBILE COMMUNICATION CO., LTD., Guangdong (CN)

(72) Inventors: Xiaohang Chen, Chang'an Dongguan (CN); Zhi Lu, Chang'an Dongguan (CN); Na Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 72 days.

(21) Appl. No.: 16/961,661

(22) PCT Filed: Jan. 8, 2019

(86) PCT No.: PCT/CN2019/070878
§ 371 (c)(1),
(2) Date: Jul. 10, 2020

(87) PCT Pub. No.: WO2019/137379
PCT Pub. Date: Jul. 18, 2019

(65) Prior Publication Data
US 2020/0404650 A1 Dec. 24, 2020

(30) Foreign Application Priority Data

Jan. 12, 2018 (CN) .......................... 201810032513.9

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1812* (2013.01); *H04L 5/0053* (2013.01); *H04W 72/0446* (2013.01)

(58) Field of Classification Search
CPC ......... H04W 72/0446; H04W 72/0413; H04W 72/00; Y02D 30/70
See application file for complete search history.

(56) References Cited

U.S. PATENT DOCUMENTS

2010/0195575 A1 8/2010 Papasakellariou et al.
2011/0268080 A1 11/2011 Luo et al.
(Continued)

FOREIGN PATENT DOCUMENTS

CN 102870367 A 1/2013
CN 103796318 A 5/2014
(Continued)

OTHER PUBLICATIONS

CN Office Action in Application No. 201810032513.9 dated Jan. 3, 2020.
(Continued)

*Primary Examiner* — Ayaz R Sheikh
*Assistant Examiner* — Debebe A Asefa
(74) *Attorney, Agent, or Firm* — Maschoff Brennan

(57) ABSTRACT

A UCI transmission method and a mobile terminal are provided, which relate to the field of communication technology and are used for ensuring normal transmission of UCI. The method includes: in a case that at least one of K first time-domain resources aggregated in a time domain on an uplink data channel conflicts with a second time-domain resource on an uplink control channel for carrying UCI, transmitting the UCI on M ones of the K first time-domain resources; K is an integer greater than 1, M is a positive integer less than or equal to K. Normal transmission of the UCI may be ensured by carrying the UCI on at least one first time-domain resource, when a time conflict occurs between time-domain resources aggregated in time domain on an
(Continued)

uplink data channel and a time-domain resource on an uplink control channel for carrying the UCI.

20 Claims, 7 Drawing Sheets

(51) Int. Cl.
  *H04L 5/00* (2006.01)
  *H04L 1/1812* (2023.01)
  *H04W 72/0446* (2023.01)

(56) References Cited

U.S. PATENT DOCUMENTS

| | | | | |
|---|---|---|---|---|
| 2015/0245232 | A1* | 8/2015 | Luo | H04L 27/0006 370/252 |
| 2015/0358827 | A1 | 12/2015 | Bendlin et al. | |
| 2016/0248442 | A1* | 8/2016 | Myung | H03M 13/2778 |
| 2018/0212736 | A1* | 7/2018 | Chatterjee | H04L 5/0053 |
| 2018/0338206 | A1 | 11/2018 | Wu et al. | |
| 2020/0288482 | A1* | 9/2020 | Yi | H04W 72/1289 |

FOREIGN PATENT DOCUMENTS

| | | |
|---|---|---|
| CN | 106465138 A | 2/2017 |
| CN | 107241805 A | 10/2017 |
| CN | 107276715 A | 10/2017 |
| WO | 2017/132811 A1 | 8/2017 |

OTHER PUBLICATIONS

"On UCI Multiplexing in Pusch" 3GPP TSG RAN WG1 Ad-Hoc Meeting, Jan. 16, 2017.
"UCI and data multiplexing for slot aggregation" 3GPP TSG RAN WG1 AH_NR Meeting, Jan. 16, 2017.
"UCI and Data Multiplexing" 3GPP TSG RAN WG1 NR Ad-Hoc Meeting, Jan. 16, 2017.
Written Opinion and International Search Report in Application No. PCT/CN2019/070878 dated Mar. 27, 2019.

* cited by examiner

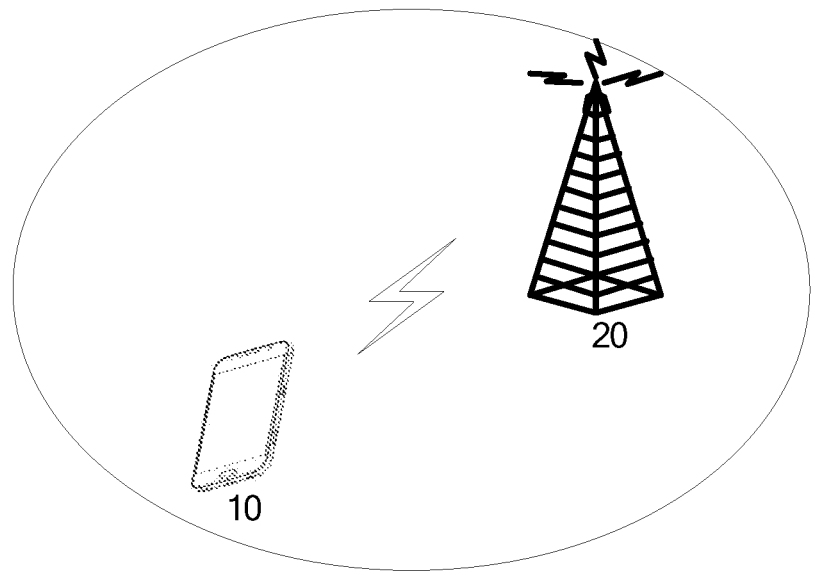
FIG.1
In a case where at least one of K first time-domain resources aggregated in a time domain on an uplink data channel conflicts with a second time-domain resource on an uplink control channel for carrying UCI, transmitting, by a mobile terminal, the UCI on M first time-domain resources among the K first time-domain resources ⸺ S11
FIG.2
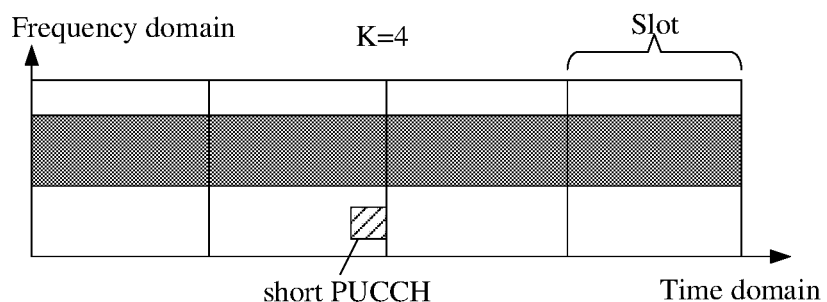
FIG.3

UCI TRANSMISSION METHOD AND MOBILE TERMINAL

CROSS-REFERENCE TO RELATED APPLICATION

This application is a U.S. national phase application of a PCT Application No. PCT/CN2019/070878 filed on Jan. 8, 2019, which claims a priority to Chinese Patent Application No. 201810032513.9 with a title of "UCI TRANSMISSION METHOD AND MOBILE TERMINAL" filed before SIPO on Jan. 12, 2018, the disclosures of which are incorporated in their entirety by reference herein.

TECHNICAL FIELD

The present disclosure relates to the field of communication technology, in particular, relates to an uplink control information (Uplink Control Information, UCI) transmission method and a mobile terminal.

BACKGROUND

With development of communication technology, more and more attention has been paid to transmission reliability. Currently, one way to improve transmission reliability is to perform time-domain aggregation on a plurality of slots or symbols on a Physical Uplink Shared Channel (Physical Uplink Shared Channel, PUSCH). One way of aggregation in a time domain is to transmit a completed packet to be transmitted per time slot or symbol and perform repeated transmission over a plurality of consecutive time slots or symbols. Another way of aggregation in the time domain is to encode, at a lower-coding rate, packets to be transmitted and distribute encoded bits over all of aggregated time slots or symbols.

However, due to single carrier characteristics of an uplink signal, a plurality of time slots or symbols occupied in the case that time-domain aggregation is performed on a PUSCH, may conflict with a time-domain resource of a physical uplink control channel (Physical Uplink Control Channel, PUCCH) configured to carry the UCI, thus affecting normal transmission of the UCI.

SUMMARY

An embodiment of the present application provide a UCI transmission method and a mobile terminal, so as to ensure normal UCI transmission when a plurality of time-domain resources aggregated in a time domain on an uplink data channel conflicts with a time-domain resource on an uplink control channel for carrying the UCI.

In order to solve the above technical problem, the present application is implemented as follows.

In a first aspect, an embodiment of the present application provide a UCI transmission. The method includes: in a case that at least one first time-domain resource of K first time-domain resources aggregated in a time domain on an uplink data channel conflicts with a second time-domain resource on an uplink control channel for carrying Uplink Control Information (UCI), transmitting, by a mobile terminal, the UCI on M first time-domain resources of the K first time-domain resources; wherein K is an integer greater than 1, M is a positive integer less than or equal to K.

In a second aspect, an embodiment of the present application provides a mobile terminal. The mobile terminal includes: a transmitting unit used for, in a case that at least one first time-domain resource of K first time-domain resources aggregated in a time domain on an uplink data channel conflicts with a second time-domain resource on an uplink control channel for carrying Uplink Control Information (UCI), transmitting the UCI on M first time-domain resources of the K first time-domain resources; wherein K is an integer greater than 1, M is a positive integer less than or equal to K In a third aspect, an embodiment of the present application provides a mobile terminal. The mobile terminal includes a processor, a storage, and a computer program stored on the storage and executable by the processor, wherein when the computer program is executed by the processor, the processor implements steps of the UCI transmission method according to the first aspect.

In a fourth aspect, an embodiment of the present application provides a computer-readable storage medium on which a computer program is stored. When the computer program is executed by a processor, the processor implements steps of the UCI transmission method according to the first aspect.

According to the UCI transmission method provided in an embodiment of the present application, in a case that at least one of the K first time-domain resources aggregated in the time domain on the uplink data channel conflicts with the second time-domain resource on the uplink control channel for carrying Uplink Control Information (UCI), the mobile terminal transmits the UCI carried on the M first time-domain resources among the K first time-domain resources. That is, when a plurality of time-domain resources aggregated in the time domain on the uplink data channel conflicts with a time-domain resource on an uplink control channel for transmitting a UCI in respect of time, the UCI is carried and transmitted over one or more of the K first time-domain resources aggregated in the time domain, thereby the UCI is transmitted by one or more of the K first time-domain resources aggregated in the time domain. Therefore, an embodiment of the present application can ensure normal transmission of the UCI when a time conflict occurs between a plurality of time-domain resources aggregated in the time domain on an uplink data channel and a time-domain resource on an uplink control channel for transmitting the UCI.

BRIEF DESCRIPTION OF THE DRAWINGS

FIG. 1 is a diagram of an architecture of a UCI transmission system provided in an embodiment of the present application;

FIG. 2 is a flowchart of steps of a UCI transmission method provided in an embodiment of the present application;

FIG. 3 is a first schematic diagram of an applied scenario of the UCI transmission method provided in an embodiment of the present application;

DETAILED DESCRIPTION

Figure 4:
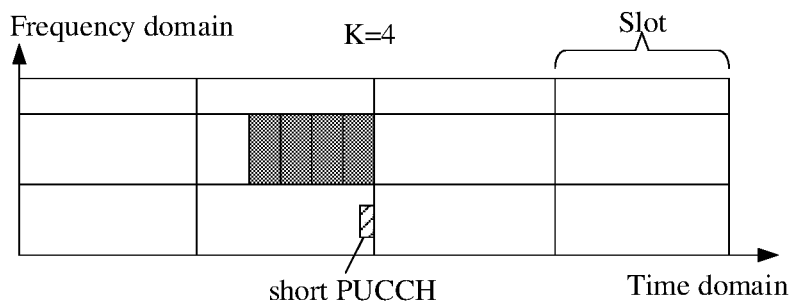
FIG. 4 is a second schematic diagram of an applied scenario of the UCI transmission method provided in an embodiment of the present application.

Technical solutions in an embodiment of the present application will be described clearly and completely below in conjunction with the accompanying drawings in an embodiment of the present application, and it is apparent that the described embodiments are a part, rather than all, of the embodiments of the present application. Based on the embodiments of the present application, all other embodiments obtained by those of ordinary skill in the art without paying creative labor are within the protection scope of the present application.

Such term as "and/or" herein is merely association relationship that describes associated objects, indicating existence of three relationship cases, for example, A and/or B may mean that A exists alone, both A and B exist, and B exists alone.

Such terms as "first", "second" and the like in the specification and claims of the present application are used to distinguish different objects and not to describe a particular order of objects. For example, a first time-domain resource and a second time-domain resource and the like are used to distinguish different time-domain resources rather than to describe a specific order of time-domain resources.

In the embodiments of the present application, such words as "exemplary" or "e.g." are used to represent examples, illustrations, or description. Any embodiment or design described as "exemplary" or "e.g." in the embodiments of the present application should not be construed as being more preferred or advantageous over other embodiments or designs. To be precise, using such words as "exemplary" or "e.g." is intended to present relevant concepts in a specific manner. In addition, in description of the embodiments of the present application, a meaning of "multiple" means two or more, unless otherwise stated.

In the prior art, due to single carrier characteristics of an uplink signal, a plurality of time slots or symbols aggregated in the time-domain on a PUSCH may conflict with a time-domain resource on a PUCCH configured to carry Uplink Control Information (UCI), thus affecting normal transmission of the UCI.

In order to solve this problem, an embodiment of the present application provides a UCI transmission method. According to the UCI transmission method, under a condition that at least one of K first time-domain resources aggregated in a time domain on an uplink data channel conflicts with a second time-domain resource on an uplink control channel used for carrying Uplink Control Information (UCI), a mobile terminal transmits the UCI by carrying the UCI on M first time-domain resources among the K first time-domain resources. That is, when a plurality of time-domain resources aggregated in the time domain on an uplink data channel conflict, in aspect of time, with a time-domain resource on an uplink control channel used for transmitting a UCI, the UCI is carried over one or more of the K first time-domain resources aggregated in the time domain, thereby transmitting the UCI on one or more of the K first time-domain resources aggregated in the time domain. Therefore, an embodiment of the present application can ensure normal transmission of the UCI when conflict occurs, in aspect of time, between the plurality of time-domain resources aggregated in the time domain on an uplink data channel and a time-domain resource on an uplink control channel used for transmitting the UCI.

As shown in FIG. 1, in an applied scenario of an embodiment of the present application, a system architecture in which the UCI transmission method provided in an embodiment of the present application is applied may include a mobile terminal 10 and a base station 20. The mobile terminal 10 is connected to the base station 20 through a wireless communication link established with the base station 20.

The mobile terminal 10 may be referred to as a terminal, a mobile station, a subscriber unit, a station, or the like. The mobile terminal may be a cellular phone, a personal digital assistant (PDA), a wireless modem, a wireless communication device, a handheld device, a laptop computer, a cordless phone, a wireless local loop (WLL), or the like. When the mobile terminal is applied to M2M communication, the mobile terminal may be referred to as an M2M terminal and specifically may be a smart meter supporting M2M communication, a smart home appliance, and the like. The mobile terminal may also be a tablet, a smart car, a sensing device, an Internet Of Things (IOT) device, a Customer-Premises Equipment (CPE), a relay base station, a relay terminal, and a computer having a mobile terminal, which may also be a portable mobile device, a pocket mobile device, a handheld mobile device, a computer-built mobile device or an on-board mobile device that exchanges language and/or data with an radio access network. For example, the mobile terminal may be a mobile phone, a Personal Communication Service (PCS) phone, a cordless phone, a Session Initiation Protocol (SIP) phone, and a Wireless Local Loop (WLL) station. The wireless terminal may also be referred to as a User Agent, a User Device, or a User Equipment (UE). As an example, in an embodiment of the present application, FIG. 1 shows an example in which the mobile terminal 10 is a mobile phone.

The base station 20 may specifically be any one or multiple combinations of following: a gNB, a New radio eNB, a transmission and reception point (TRP), a macro base station, a micro base station, a high-frequency base station, a Long Term Evolution (LTE) macro eNB or a LTE micro eNB, a CPE, a WLAN Access Point (AP), a WLAN Group Owner (GO), or the like.

First Embodiment

An embodiment of the present application provides a UCI transmission method, shown in FIG. 2. The method includes a step S11.

S11: in a case that at least one first time-domain resource of K first time-domain resources aggregated in a time domain on an uplink data channel conflicts with a second time-domain resource on an uplink control channel for carrying Uplink Control Information (UCI), transmitting, by a mobile terminal, the UCI on M first time-domain resources among the K first time-domain resources.

K is an integer greater than 1; M is a positive integer less than or equal to K.

Optionally, the uplink data channel in an embodiment of the present application may be specifically a Physical Uplink Shared Channel (PUSCH), and the uplink control channel may be specifically a Physical Uplink Control Channel (PUCCH).

In addition, the uplink data channel in an embodiment of the present application may be another channel for transmitting uplink data, and the uplink control channel may be another uplink control channel for transmitting UCI, and the present application is not limited thereto.

Optionally, each first time-domain resource of the K first time-domain resources is a slot.

Optionally, each first time-domain resource of the K first time-domain resources is a symbol.

Specifically, a time length of one symbol is a time length of transmitting an Orthogonal Frequency Division Multiplexing (OFDM) symbol. A length of each first time-domain resource of the K first time-domain resources may be the time length of transmitting one OFDM symbol.

Optionally, each of the K first time-domain resources is P consecutive symbols; P is an integer greater than 1.

In some cases, a plurality of consecutive symbols is also referred to as a mini-slot, and thus it can also be understood that any one of the K first time-domain resources is a mini-slot.

When any one of the K first time-domain resources is a mini-slot, the step S11 is: in a case that at least one of the K mini-slots aggregated in the time domain on the uplink data channel conflicts with the second time-domain resource for carrying the UCI on the uplink control channel, carrying, by the mobile terminal, the UCI on M mini-slots of the K mini-slots.

Optionally, the second time-domain resource is a time-domain resource carrying a short PUCCH; or the second time-domain resource is a time-domain resource carrying a long PUCCH.

Specifically, a New Radio (NR) system supports both a short PUCCH uplink control channel configuration and a long PUCCH uplink control channel configuration. The short PUCCH has a length of 1 or 2 symbols in the time domain, and the long PUCCH has a length of 4 to 14 symbols in the time domain. The short PUCCH can support scenarios where UCI needs to be sent quickly, while the long PUCCH can provide better coverage performance.

Optionally, data packets carried by each of the K first time-domain resources are the same.

That is, a complete packet to be transmitted is transmitted on each of the K first time-domain resources, and repeated transmission is performed on the K first time-domain resources.

Optionally, each of the K first time-domain resources carries a respective coding segment of the same data packet.

In particular, the packet to be transmitted can be coded at a low coding rate, and coding of the packet to be transmitted can be segmented according to a size of K, and each of the K first time-domain resources is used to carry a respective coding segment of the packet to be transmitted, so as to transmit the coding of the packet to be transmitted by distributing coding segments of the packet to be transmitted over the K first time-domain resources, respectively.

Optionally, the length of the second time-domain resource is less than or equal to the length of a first time-domain resource.

Optionally, the length of the second time-domain resource is greater than the length of a first time-domain resource and less than a length of an entirety of the K first time-domain resources.

Optionally, the length of the second time-domain resource is greater than or equal to the length of the entirety of the K first time-domain resources.

The UCI transmission method provided by the above embodiment is described in detail below with respect to different applied scenarios.

First Scenario 1) the mobile terminal is configured, by a Radio Resource Control (RRC) higher-layer signaling, with the number K of first time-domain resources (time slots, or mini-slots, or symbols) aggregated in a time domain on the uplink data channel, and the mobile terminal receives an UpLink grant (UL grant) that schedules time-domain resources with a mapping type A or a mapping type B on the uplink control channel; the mobile terminal repeats transmission of the same Transport Block (TB) over K first time-domain resources aggregated in the time domain, or the mobile terminal transmits a respective coding segment of the same data packet through each of the K first time-domain resources; or, 2) the mobile terminal is semi-statically configured with an uplink grant-free transmission type 1 (type 1 UPlink transmission without grant) by a RRC higher-layer signaling, in which a higher-layer configuration parameter configures a time-domain resource of a mapping type B on the uplink control channel, and the number K of repetitions configured in the higher-layer configuration parameter is greater than 1; the mobile terminal repeats transmission of the same TB over K first time-domain resources (time slots, or mini-slots, or symbols) aggregated in the time domain, starting from a configured transmission time point; or the mobile terminal transmits a respective coding segment of the same data packet over each of the K first time-domain resources, starting from a configured transmission time point; or, 3) the mobile terminal is semi-statically configured with an uplink grant-free transmission type 2 (type 2 UPlink transmission without grant) by a RRC higher-layer signaling, in which the number K of repetitions configured in a higher-layer configuration parameter is greater than 1 and the mobile terminal activates a type-2 resource through receiving an uplink activating signaling which indicates a time-domain resource of a PUSCH mapping type A or type B of type-2 transmission; the mobile terminal repeats transmission of the same TB over K first time-domain resources (time slots, or mini-slots, or symbols) aggregated in the time domain, starting from a configured transmission time point; or the mobile terminal transmits a respective coding segment of the same data packet over each of the K first time-domain resources, starting from a configured transmission time point.

In the above cases, if the mobile terminal needs to send a UCI such as an Acknowledgement (ACK), a Negative Acknowledgement (NACK), a Channel Quality Indicator (CSI) and the like on a second time-domain resource on the PUCCH, then the second time-domain resource on the PUCCH may conflict with the K first time-domain resources on a PUSCH.

Specifically, referring to FIG. 3, FIG. 4, FIG. 5, and FIG. 6 below, a scenario in which, when the length of the second time-domain resource is less than or equal to the length of a first time-domain resource, a second time-domain resource conflicts with at least one first time-domain resource is illustrated.

Referring to FIG. 3, one short PUCCH conflicts with at least one of K first time-domain resources aggregated in the time domain on an uplink data channel. The first time-domain resource is a time-domain resource, having a mapping type of type A, of a PUCCH; and the length of the short PUCCH is smaller than that of the first time-domain resource. In FIG. 3, K=4 is taken as an example.

Referring to FIG. 4, one short PUCCH conflicts with at least one of K first time-domain resources aggregated in the time domain on an uplink data channel. The first time-domain resource is a time-domain resource, having a mapping type of type B, of a PUCCH; and the length of the short PUCCH is smaller than that of the first time-domain resource. In FIG. 3, K=4 is taken as an example. In FIG. 4, K=4 is taken as an example.

Figure 5:
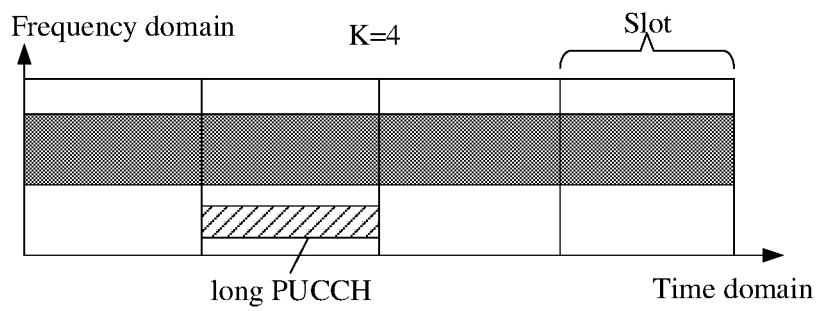
FIG. 5 is a third schematic diagram of an applied scenario of the UCI transmission method provided in an embodiment of the present application.

Referring to FIG. 5, one long PUCCH conflicts with at least one of K first time-domain resources aggregated in the time domain on an uplink data channel. The first time-domain resource is a time-domain resource, having a mapping type of type A, of a PUCCH; and the length of the long PUCCH is smaller than that of the first time-domain resource. In FIG. 5, K=4 is taken as an example.

Figure 6:
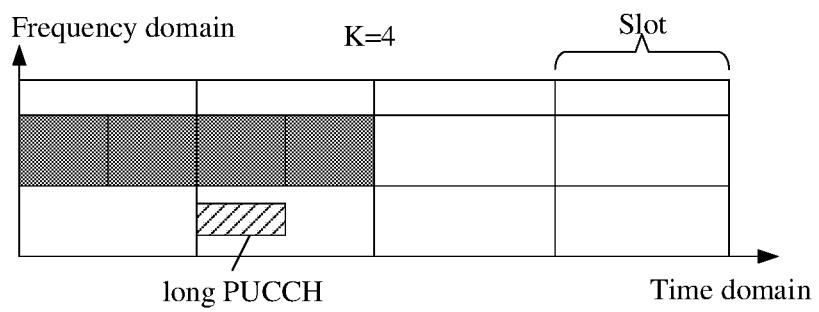
FIG. 6 is a fourth schematic diagram of an applied scenario of the UCI transmission method provided in an embodiment of the present application.

Referring to FIG. 6, one long PUCCH conflicts with at least one of K first time-domain resources aggregated in the time domain on an uplink data channel. The first time-domain resource is a time-domain resource, having a mapping type of type B, of a PUCCH; and the length of the long PUCCH is smaller than that of the first time-domain resource. In FIG. 6, K=4 is taken as an example.

In a first aspect, in the scenarios shown in FIGS. 3, 4, 5, and 6, embodiments of the present application may transmit the UCI by carrying the UCI on one of the K first time-domain resources in the following manner.

1-1-1: transmitting the UCI carried on a first time-domain resource, conflicting with a second time-domain resource, among the K first time-domain resources, and transmitting the UCI.

In the scenarios shown in FIGS. 3, 4, 5, and 6 above, the first time-domain resource conflicting with the second time-domain resource is one first time-domain resource. Thus, the UCI is carried on a first time-domain resource conflicting with the second time-domain resource among the K first time-domain resources and is sent on the first time-domain resource. That is, the UCI is transmitted on the first time-domain resource, conflicting with the second time-domain resource, among the K first time-domain resources.

Figure 7:
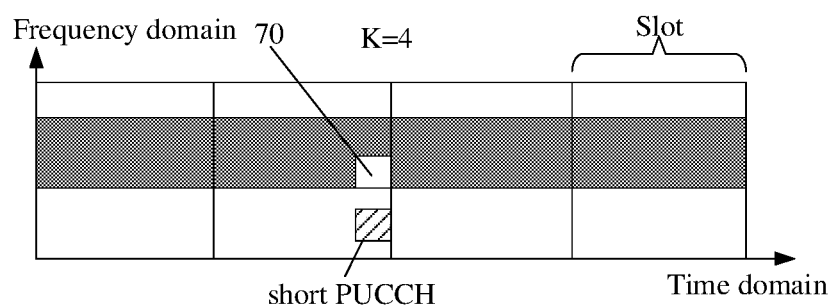
FIG. 7 is a fifth schematic diagram of an applied scenario of the UCI transmission method provided in an embodiment of the present application.

Optionally, referring to FIG. 7, specific implementation of the above 1-1-1 may be as follows: puncturing data on a first time-domain resource conflicting with a second time-domain resource; carrying the UCI on a punctured resource 70 of the first time-domain resource conflicting with the second time-domain resource and sending the UCI on the punctured resource 70.

Specifically, data on a preset Resource Element (RE) on a first time-domain resource conflicting with a second time-domain resource may be punctured. The preset RE may be a reserved RE, or a predefined RE, or a fixed RE.

1-1-2: carrying the UCI on a first one of the K first time-domain resources, and transmitting the UCI.

Figure 8:
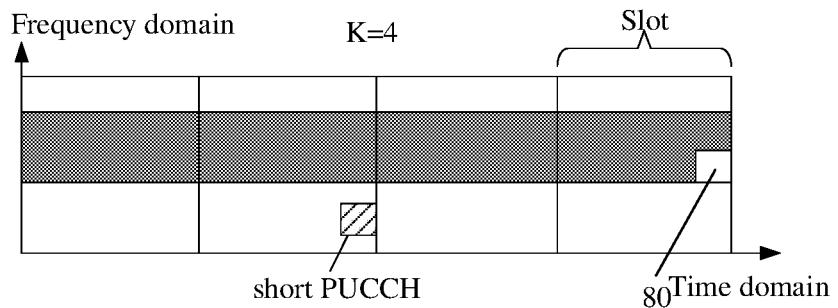
FIG. 8 is a sixth schematic diagram of an applied scenario of the UCI transmission method provided in an embodiment of the present application.

Optionally, referring to FIG. 8, specific implementation of the above 1-1-2 may be as follows: puncturing data on a first one of the K first time-domain resources; carrying the UCI on a punctured resource 80 of the first one of the K first time-domain resources and sending the UCI on the punctured resource 80.

Specifically, data on a preset RE on the first one of the K first time-domain resources may be punctured. The preset RE may be a reserved RE, or a predefined RE, or a fixed RE.

1-1-3: carrying the UCI on a last one of the K first time-domain resources, and transmitting the UCI.

Figure 9:
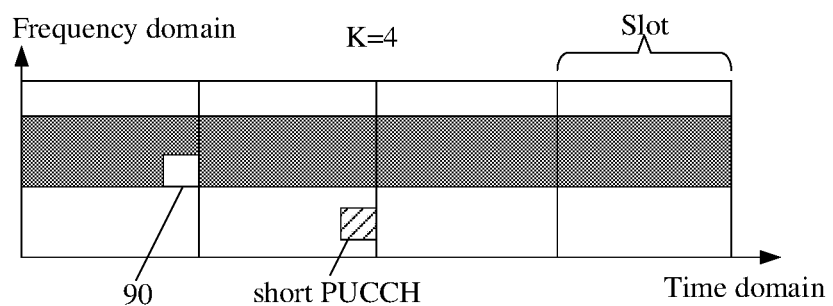
FIG. 9 is a seventh schematic diagram of an applied scenario of the UCI transmission method provided in an embodiment of the present application.

Optionally, referring to FIG. 9, specific implementation of the above 1-1-3 may be as follows: puncturing data on a last one of the K first time-domain resources; carrying the UCI on a punctured resource 90 of the last one of the K first time-domain resources and sending the UCI on the punctured resource 90.

Specifically, data on a preset RE on the last one of the K first time-domain resources may be punctured. The preset RE may be a reserved RE, or a predefined RE, or a fixed RE.

1-1-4: carrying the UCI on one of first time-domain resources, supporting carrying the UCI, among the K first time-domain resources, and transmitting the UCI.

It should be noted that, in some cases, the number of the first time-domain resources supporting carrying the UCI is two or more, and one first time-domain resources for carrying the UCI may be selected from the two or more first time-domain resources supporting the UCI according to a preset rule, to carry the UCI.

Optionally, the number of first time-domain resources supporting carrying the UCI is two or above.

Carrying the UCI on one of first time-domain resources, supporting carrying the UCI, among the K first time-domain resources, and transmitting the UCI, includes: carrying the UCI on a first one of first time-domain resources, supporting carrying the UCI, among the K first time-domain resources, and transmitting the UCI; or, carrying the UCI on a last one of first time-domain resources, supporting carrying the UCI, among the K first time-domain resources, and transmitting the UCI.

Further, the first time-domain resources supporting carrying the UCI in the above embodiments may be configured by the network-side device, and a manner of the configuration may be explicit configuration or implicitly known through other configuration information.

For example, when a PUSCH w/repetition is transmitted in a Redundant Version cycling (RV cycling) manner, the UCI is carried on a first time-domain resource using a redundant version capable of self-decoding on a PUSCH. For example, RV0 and RV3 are RV versions capable of self-decoding, and RV2 and RV1 are RV versions incapable of self-decoding, then the UCI is carried on a first time-domain resource using RV0 or RV3 for transmission.

Figure 10:
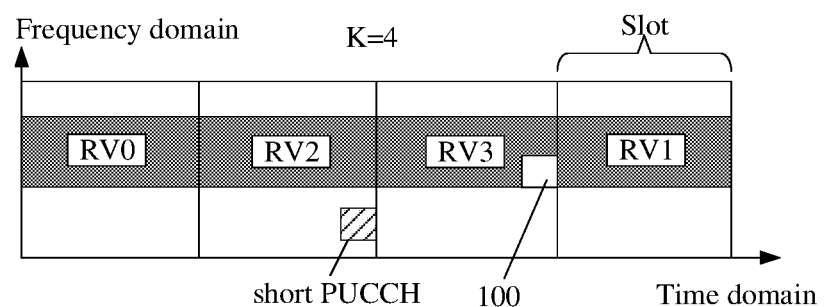
FIG. 10 is an eighth schematic diagram of an applied scenario of the UCI transmission method provided in an embodiment of the present application.

Optionally, referring to FIG. 10, specific implementation of the above 1-1-4 may be as follows: puncturing data on one of the first time-domain resources, supporting carrying the UCI, among the K first time-domain resources (FIG. 10 is illustrated through a case that only one first time-domain resource supporting carrying the UCI is included in the K first time-domain resources); carrying the UCI on a punctured resource 100 of the one of the first time-domain resources, supporting carrying the UCI, among the K first time-domain resources.

Specifically, data on a preset RE on the first time-domain resource, supporting carrying the UCI, of the K first time-domain resources may be punctured. The preset RE may be a reserved RE, or a predefined RE, or a fixed RE.

In a second aspect, in scenarios shown in FIGS. 3, 4, 5, and 6, the embodiments of the present application may transmit the UCI carried on a plurality of first time-domain resources among the K first time-domain resources in following manners.

1-2-1: transmitting the UCI carried on a first conflict time-domain resource and a second conflict time-domain resource; the first conflict time-domain resource is a first one, conflicting with the second time-domain resource, among the K first time-domain resources; the second conflict time-domain resource includes a first time-domain resource, located after the first conflict time-domain resource, among the K first time-domain resources.

In the scenarios shown in FIGS. 3, 4, 5, and 6 above, each first time-domain resource conflicting with the second time-domain resource is a first time-domain resource. Thus, the first one, conflicting with the second time-domain resource, among the K time-domain resources is the first time-domain resource conflicting with the second time-domain resource.

Figure 11:
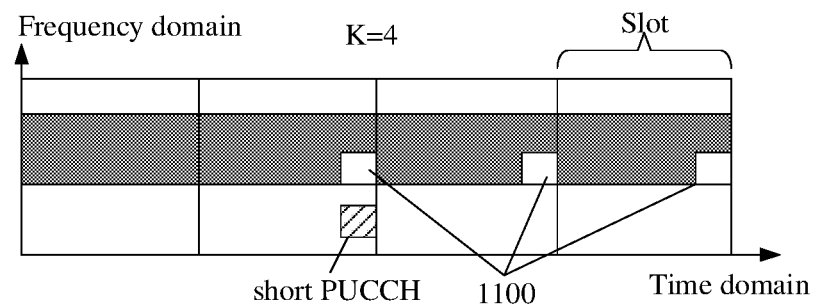
FIG. 11 is a ninth schematic diagram of an applied scenario of the UCI transmission method provided in an embodiment of the present application.

Optionally, referring to FIG. 11, specific implementation of transmitting the UCI carried on a first conflict time-domain resource and a second conflict time-domain resource may be as follows: puncturing data on each first time-domain resource in the first conflict time-domain resource and the second conflict time-domain resource; transmitting the UCI carried on a punctured resource 1100 of each first time-domain resource in the first conflict time-domain resource and the second time-domain resource.

Further optionally, transmitting the UCI carried on the punctured resource 1100 of each first time-domain resource of the first conflict time-domain resource and the second conflict time-domain resource in the above 1-2-1 may specifically be: transmitting the UCI carried repeatedly on punctured resources 1100 of first time-domain resource of the first conflict time-domain resource and the second conflict time-domain resource.

Further optionally, transmitting the UCI carried on the punctured resource 1100 of each first time-domain resource of the first conflict time-domain resource and the second conflict time-domain resource in the above 1-2-1 may specifically be: dividing coded bits of the UCI into M coding segments; transmitting a coding segment on a punctured resource of a first time-domain resource of the first conflict time-domain resource and the second conflict time-domain resource.

1-2-2: transmitting the UCI carried on all first time-domain resources, supporting carrying the UCI, among the K first time-domain resources; wherein the first time-domain resources, supporting carrying the UCI, among the K first time-domain resources include a plurality of first time-domain resources.

Figure 12:
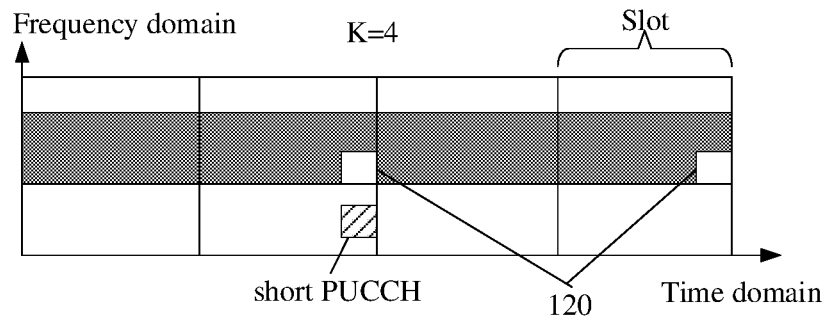
FIG. 12 is a tenth schematic diagram of an applied scenario of the UCI transmission method provided in an embodiment of the present application.

Referring to FIG. 12, FIG. 12 illustrates an example in which the first time-domain resources supporting carrying the UCI include two time-domain resources. Optionally, specific implementation of the above 1-2-2 may be as follows: puncturing data on each of the first time-domain resources supporting carrying the UCI; transmitting the UCI carried on a punctured resource 120 of each of the first time-domain resources supporting carrying the UCI.

Further optionally, transmitting the UCI carried on a punctured resource 120 of each of the first time-domain resources supporting carrying the UCI in the above 1-2-2 may specifically be: dividing coded bits of the UCI into M coding segments; transmitting a coding segment on a punctured resource of the first time-domain resources supporting carrying the UCI.

Further optionally, transmitting the UCI carried on a punctured resource 120 of each of the first time-domain resources supporting carrying the UCI in the above 1-2-2 may specifically be: dividing coded bits of the UCI into M coding segments; transmitting a coding segment carried on the punctured resource 120 of a first time-domain resource supporting carrying the UCI.

1-2-3: transmitting the UCI carried on each of the K first time-domain resources.

Figure 13:
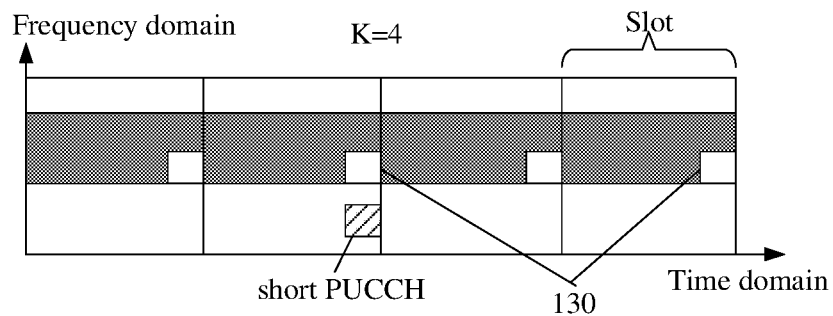
FIG. 13 is an eleventh schematic diagram of an applied scenario of the UCI transmission method provided in an embodiment of the present application.

Optionally, referring to FIG. 13, specific implementation of transmitting the UCI carried on each of the K first time-domain resources, may be as follows: puncturing data on each of the K first time-domain resources; transmitting the UCI carried on a punctured resource 130 of each of the K first time-domain resources.

Further optionally, transmitting the UCI carried on a punctured resource 130 of each of the K first time-domain resources may specifically be: transmitting the UCI by carrying repeatedly the UCI on the punctured resources 130 of each of the K first time-domain resources.

Further optionally, transmitting the UCI carried on a punctured resource 130 of each of the K first time-domain resources may specifically be: dividing coded bits of the UCI into M coding segments; transmitting a coding segment carried on a punctured resource of one of the K first conflict time-domain resources.

In a third aspect, in the scenarios shown in FIG. 3, FIG. 4, FIG. 5, and FIG. 6 above, if a data packet carried by each of the K first time-domain resources is the same as data packets carried by others of the K first time-domain resources and M is equal to K, then transmitting the UCI carried on M first time-domain resources of the K first time-domain resources by the mobile terminal in the above embodiments may specifically include 1-3-1.

1-3-1: transmitting, by the mobile terminal, a first data packet carried on M first time-domain resources of the K first time-domain resources; wherein the first data packet is a data packet generated by performing rate-matching on a data packet carried by any one of the first time-domain resources and the UCI.

That is, the rate-matching is performed on a data packet to be transmitted originally carried on the first time-domain resource and the UCI on a second time-domain resource conflicting with the first time-domain resource, to newly generate a data packet. The newly generated data packet is then repeatedly carried on K first time-domain resources aggregated in the time domain.

In the second aspect, the third aspect, and the fourth aspect, the UCI is carried and transmitted on a plurality of first time-domain resources, so that reliability of UCI transmission can be improved.

Second Scenario 1) the mobile terminal is configured, by an RRC higher-layer signaling, with the number K of first time-domain resources (mini-slots, or symbols) aggregated in a time domain on the uplink data channel, and the mobile terminal receives a UL grant that schedules time-domain resources with a mapping type B on the uplink control channel; the mobile terminal repeats transmission of the same Transport Block (TB) over K first time-domain resources aggregated in the time domain, or the mobile terminal transmits a respective coding segment of the same data packet through each of the K first time-domain resources; or, 2) the mobile terminal is semi-statically configured with an uplink grant-free transmission type 1 (type 1 UPlink transmission without grant) by a RRC higher-layer signaling, in which a higher-layer configuration parameter configures a time-domain resource of a mapping type B on the uplink control channel, and the number K of repetitions configured in the higher-layer configuration parameter is greater than 1; the mobile terminal repeats transmission of the same TB over K first time-domain resources (mini-slots, or symbols) aggregated in the time domain, starting from a configured transmission time point; or the mobile terminal transmits a respective coding segment of the same data packet on each of the K first time-domain resources, starting from a configured transmission time point; or, 3) the mobile terminal is semi-statically configured with an uplink grant-free transmission type 2 (type 2 UPLink transmission without grant) by a RRC higher-layer signaling, in which the number K of repetitions configured in a higher-layer configuration parameter is greater than 1 and the mobile terminal activates a type-2 resource through receiving an uplink activating signaling which indicates a time-domain resource of a PUSCH mapping type B of type-2 transmission; the mobile terminal repeats transmission of the same TB over K first time-domain resources aggregated in the time domain, starting from a configured transmission time point; or the mobile terminal transmits a respective coding segment of the same data packet over each of the K first time-domain resources, starting from a configured transmission time point.

In the above cases, if the mobile terminal has started to transmit data on the K first time-domain resources aggregated in the time-domain, and during the transmission, the mobile terminal needs to transmit a UCI such as an ACK, a NACK, a CSI and the like on a second time-domain resource on the PUCCH, then the second time-domain resource on the PUCCH may conflict with the K first time-domain resources on a PUSCH.

Specifically, referring to FIG. 14 below, a scenario in which, when the length of the second time-domain resource is larger than the length of a first time-domain resource and smaller than a total length of the K first time-domain resources, a second time-domain resource conflicts with a first time-domain resource is illustrated.

Figure 14:
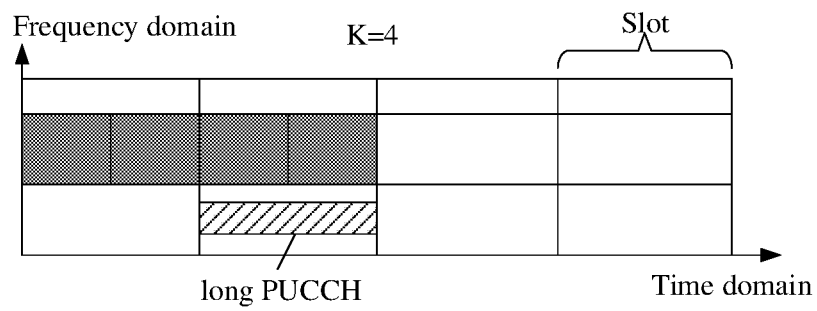
FIG. 14 is a twelfth schematic diagram of an applied scenario of the UCI transmission method provided in an embodiment of the present application.

Referring to FIG. 14, one long PUCCH conflicts with at least one of K first time-domain resources aggregated in the time domain, wherein the first time-domain resources are time-domain resources, having the mapping type of typeB, of a PUSCH, and the length of the long PUCCH is larger than the length of a first time-domain resource and smaller than the total length of the K first time-domain resources. In FIG. 14, a case that K=4 and a long PUCCH conflicts with two of K first time-domain resources aggregated in the time domain is taken as an example.

In a first aspect, in the scenario shown in FIG. 14, an embodiment of the present application may transmit the UCI by carrying the UCI on one of the K first time-domain resources in the following manner:

2-1-1: transmitting the UCI carried on one of the first time-domain resources conflicting with the second time-domain resource.

As described above, since the length of the second time-domain resource is larger than the length of one first time-domain resource and smaller than the total length of the K first time-domain resources, first time-domain resources, conflicting with the second time-domain resource, among the K first time-domain resources includes a plurality of first time-domain resources. In an embodiment of the present application, one first time-domain resource may be selected from the plurality of first time-domain resources, conflicting with the second time-domain resource, among the K first time-domain resources in the following manner: selecting a first one, conflicting with the second time-domain resource, of the plurality of first time-domain resources; or, selecting a last one, conflicting with the second time-domain resource, of the plurality of first time-domain resources.

Figure 15:
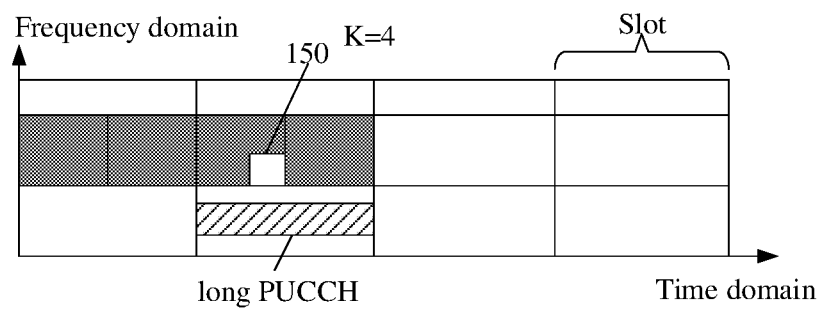
FIG. 15 is a thirteenth schematic diagram of an applied scenario of the UCI transmission method provided in an embodiment of the present application.

Optionally, referring to FIG. 15, specific implementation of the above 1-1-4 may be as follows: puncturing data on one of the first time-domain resources conflicting with the second time-domain resource (FIG. 15 illustrates an example in which the plurality of first time-domain resources, conflicting with the second time-domain resource, among the K first time-domain resource, include two first time-domain resources, and a first one of the two first time-domain resources conflicting with the second time-domain resources is selected); transmitting the UCI carried on a punctured resource 150 of the first one of the first time-domain resources conflicting with the second time-domain resource.

2-1-2: transmitting the UCI carried on a first one of the K first time-domain resources.

Specific implementation of transmitting the UCI carried on a first one of the K first time-domain resources may be obtained by referring to the specific implementation of the above 1-1-2, and will not be described herein again.

2-1-3: transmitting the UCI carried on a last one of the K first time-domain resources.

Specific implementation of transmitting the UCI carried on a last one of the K first time-domain resources may be obtained by referring to the specific implementation of the above 1-1-3, and will not be described herein again.

2-1-4; transmitting the UCI carried on a first time-domain resource, supporting carrying the UCI, of the K first time-domain resources.

Specific implementation of transmitting the UCI carried on a first time-domain resource, supporting carrying the UCI, of the K first time-domain resources may be obtained by referring to the specific implementation of the above 1-1-4, and will not be described herein again.

In a second aspect, in the scenario shown in FIG. 14, an embodiment of the present application may transmit the UCI by carrying the UCI on a plurality of first time-domain resources of the K first time-domain resources in the following manners.

2-2-1: transmitting the UCI carried on first time-domain resources, conflicting with the second time-domain resource, of the K first time-domain resources.

Since the length of the second time-domain resource is larger than the length of one first time-domain resource and smaller than the total length of the K first time-domain resources, first time-domain resources, conflicting with the second time-domain resource, among the K first time-domain resources include a plurality of first time-domain resources.

Figure 16:
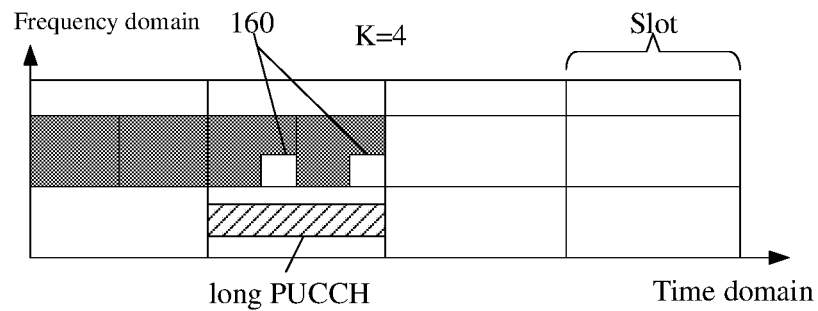
FIG. 16 is a fourteenth schematic diagram of an applied scenario of the UCI transmission method provided in an embodiment of the present application.

Optionally, referring to FIG. 16, specific implementation of the above 2-2-1 may be as follows: puncturing data on first time-domain resources, conflicting with the second time-domain resource, among the K first time-domain resources (FIG. 16 illustrates an example in which the K first time-domain resources include two first time-domain resources conflicting with the second time-domain resource); transmitting the UCI carried on a punctured resource 160 of the first time-domain resources, conflicting with the second time-domain resource, among the K first time-domain resources.

Further optionally, transmitting the UCI carried on a punctured resource 160 of the first time-domain resources, conflicting with the second time-domain resource, among the K first time-domain resources in the above 2-2-1, may specifically be: transmitting the UCI repeatedly carried on punctured resources 160 of the first time-domain resources, conflicting with the second time-domain resource, among the K first time-domain resources.

Further optionally, transmitting the UCI carried on a punctured resource 160 of the first time-domain resources, conflicting with the second time-domain resource, among the K first time-domain resources in the above 2-2-1, may specifically be: dividing coded bits of the UCI into M coding segments; transmitting a coding segment on a punctured resource 160 of a first time-domain resource conflicting with the second time-domain resource.

2-2-2: transmitting the UCI carried on first time-domain resources, supporting carrying the UCI, of the K first time-domain resources, wherein the first time-domain resources, supporting carrying the UCI, of the K first time-domain resources include a plurality of first time-domain resources.

Specific implementation of transmitting the UCI carried on first time-domain resources, supporting carrying the UCI, of the K first time-domain resources, may be obtained by referring to the specific implementation of the above 1-2-2, and will not be described herein again.

2-2-3: transmitting the UCI carried on each of the K first time-domain resources.

Specific implementation of transmitting the UCI carried on each of the K first time-domain resources may be obtained by referring to the specific implementation of the above 1-2-3, and will not be described herein again.

In a third aspect, in the scenario shown in FIG. 14 above, if a data packet carried by each of the K first time-domain resources is the same as data packets carried by others of the K first time-domain resources and M is equal to K, then transmitting the UCI carried on M first time-domain resources of the K first time-domain resources by the mobile terminal in the above embodiments may specifically include 2-3-1.

2-3-1: transmitting, by the mobile terminal, a first data packet carried on M first time-domain resources of the K first time-domain resources; wherein the first data packet is a data packet generated by performing rate-matching on a data packet carried by any one of the first time-domain resources and the UCI.

Third Scenario 1) the mobile terminal is configured, by an RRC higher-layer signaling, with the number K of first time-domain resources (time slots, or mini-slots, or symbols) aggregated in a time domain on the uplink data channel, and the mobile terminal receives a UL grant that schedules time-domain resources with a mapping typeA or a mapping typeB on the uplink control channel; the mobile terminal repeats transmission of the same TB over K first time-domain resources aggregated in the time domain, or the mobile terminal transmits a respective coding segment of the same data packet through each of the K first time-domain resources; or, 2) the mobile terminal is semi-statically configured with an uplink grant-free transmission type 1 (type1 UPLink transmission without grant) by an RRC higher-layer signaling, in which a higher-layer configuration parameter configures a time-domain resource of a mapping type B on the uplink control channel, and the number K of repetitions configured in the higher-layer configuration parameter is greater than 1; the mobile terminal repeats transmission of the same TB over K first time-domain resources (time slots, or mini-slots, or symbols) aggregated in the time domain, starting from a configured transmission time point; or the mobile terminal transmits a respective coding segment of the same data packet over each of the K first time-domain resources, starting from a configured transmission time point; or, 3) the mobile terminal is semi-statically configured with an uplink grant-free transmission type 2 (type 2 UPLink transmission without grant) by an RRC higher-layer signaling, in which the number K of repetitions configured in a higher-layer configuration parameter is greater than 1 and the mobile terminal activates a type-2 resource through receiving an uplink activating signaling which indicates a time-domain resource of a PUSCH mapping typeA or typeB of type-2 transmission; the mobile terminal repeats transmission of the same TB over K first time-domain resources (time slots, or mini-slots, or symbols) aggregated in the time domain, starting from a configured transmission time point; or the mobile terminal transmits a respective coding segment of the same data packet over each of the K first time-domain resources, starting from a configured transmission time point.

In the above cases, if the mobile terminal has started to transmit the UCI on a second time-domain resource on an uplink control channel, and during the transmission, the mobile terminal needs to transmit data on K first time-domain resources aggregated on an uplink data channel, then the second time-domain resource on the uplink control channel may conflict with the K first time-domain resources on the uplink data channel.

Specifically, referring to FIG. 17 below, a scenario in which a starting time point of transmitting the UCI on the second time-domain resource on the uplink control channel is ahead of a starting time point of transmitting data on the uplink data channel, and the length of the second time-domain resource is larger than a total length of the K first time-domain resources.

Figure 17:
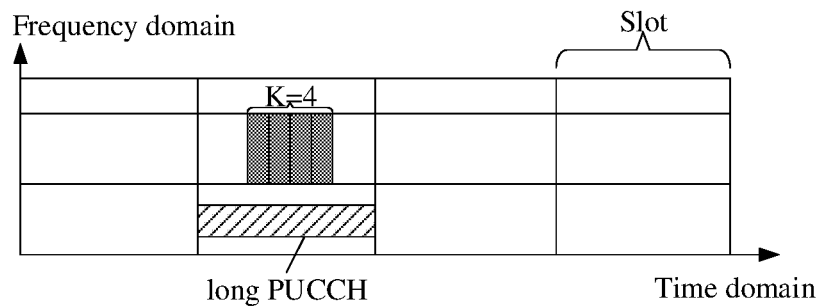
FIG. 17 is a fifteenth schematic diagram of an applied scenario of the UCI transmission method provided in an embodiment of the present application.

As shown in FIG. 17, when one long PUCCH conflicts with a resource, having a mapping type of typeA, in the PUSCH, and when the starting time point of transmitting the UCI on the second time-domain resource on the uplink control channel is ahead of the starting time point of transmitting data on the uplink data channel, and when the length of the long PUCCH in the time domain is larger than a total length of the K first time-domain resources, the long PUCCH conflicts with each of the K first time-domain resources aggregated in the time domain on the PUSCH. In FIG. 17, K=4 is taken as an example.

In a first aspect, in the scenario shown in FIG. 17, an embodiment of the present application may transmit the UCI by carrying the UCI on one of the K first time-domain resources in following manners:

3-1-1: transmitting the UCI carried on a first one of the K first time-domain resources.

Specific implementation of transmitting the UCI carried on a first one of the K first time-domain resources may be obtained by referring to the specific implementation of the above 1-1-2, and will not be described herein again.

3-1-2: transmitting the UCI carried on a last one of the K first time-domain resources.

Specific implementation of transmitting the UCI carried on a last one of the K first time-domain resources may be obtained by referring to the specific implementation of the above 1-1-3, and will not be described herein again.

3-1-3: transmitting the UCI carried on one of first time-domain resources, supporting carrying the UCI, of the K first time-domain resources.

Specific implementation of transmitting the UCI carried on one of first time-domain resources, supporting carrying the UCI, of the K first time-domain resources may be obtained by referring to the specific implementation of the above 1-1-4, and will not be described herein again.

In a second aspect, in the scenario shown in FIG. 17, an embodiment of the present application may transmit the UCI by carrying the UCI on a plurality of first time-domain resources of the K first time-domain resources in the following manners.

3-2-1: transmitting the UCI carried on first time-domain resources, supporting carrying the UCI, of the K first time-domain resources, wherein the first time-domain resources, supporting carrying the UCI, of the K first time-domain resources include a plurality of first time-domain resources.

Specific implementation of transmitting the UCI carried on first time-domain resources, supporting carrying the UCI, of the K first time-domain resources may be obtained by referring to the specific implementation of the above 1-2-2, and will not be described herein again.

3-2-2: transmitting the UCI carried on each of the K first time-domain resources.

Specific implementation of transmitting the UCI carried on each of the K first time-domain resources may be obtained by referring to the specific implementation of the above 1-2-3, and will not be described herein again.

In a third aspect, in the scenario shown in FIG. 17 above, if a data packet carried by each of the K first time-domain resources is the same as data packets carried by others of the K first time-domain resources and M is equal to K, then transmitting the UCI carried on M first time-domain resources of the K first time-domain resources by the mobile terminal in the above embodiments may specifically include 3-3-1.

3-3-1: transmitting, by the mobile terminal, a first data packet carried on M first time-domain resources of the K first time-domain resources; wherein the first data packet is a data packet generated by performing rate-matching on a data packet carried by any one of the first time-domain resources and the UCI.

Fourth Scenario 1) the mobile terminal is configured, by an RRC higher-layer signaling, with the number K of first time-domain resources (mini-slots, or symbols) aggregated in a time domain on the uplink data channel, and the mobile terminal receives a UL grant that schedules time-domain resources with a mapping type B or a mapping type A on the uplink control channel; the mobile terminal repeats transmission of the same Transport Block (TB) over K first time-domain resources aggregated in the time domain, or the mobile terminal transmits a respective coding segment of the same data packet through each of the K first time-domain resources; or, 2) the mobile terminal is semi-statically configured with an uplink grant-free transmission type 1 (type 1 UPLink transmission without grant) by a RRC higher-layer signaling, in which a higher-layer configuration parameter configures a time-domain resource of a mapping type A or a mapping type B on the uplink control channel, and the number K of repetitions configured in the higher-layer configuration parameter is greater than 1; the mobile terminal repeats transmission of the same TB over K first time-domain resources (slots, mini-slots, or symbols) aggregated in the time domain, starting from a configured transmission time point; or the mobile terminal transmits a respective coding segment of the same data packet on each of the K first time-domain resources, starting from a configured transmission time point; or, 3) the mobile terminal is semi-statically configured with an uplink grant-free transmission type 2 (type 2 UPLink transmission without grant) by a RRC higher-layer signaling, in which the number K of repetitions configured in a higher-layer configuration parameter is greater than 1 and the mobile terminal activates a type-2 resource through receiving an uplink activating signaling which indicates a time-domain resource of a PUSCH mapping type A or type B of type-2 transmission; the mobile terminal repeats transmission of the same TB over K first time-domain resources (slots, or mini-slots, or symbols) aggregated in the time domain, starting from a configured transmission time point; or the mobile terminal transmits a respective coding segment of the same data packet over each of the K first time-domain resources, starting from a configured transmission time point.

In the above cases, if, the mobile terminal needs to transmit a UCI such as an ACK, a NACK, a CSI and the like on a second time-domain resource on the PUCCH, then the second time-domain resource on the PUCCH may conflict with the K first time-domain resources on a PUSCH.

Specifically, referring to FIG. 18, FIG. 19, FIG. 20, FIG. 21, and FIG. 22 below, illustration of a scenario where a plurality of second time-domain resources conflicts with at least one of K first time-domain resources, and a length of any of the second time-domain resources is less than or equal to a length of a first time-domain resource is provided.

Figure 18:
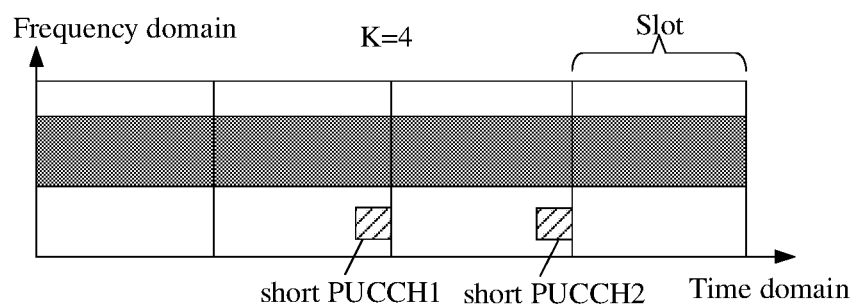
FIG. 18 is a sixteenth schematic diagram of an applied scenario of the UCI transmission method provided in an embodiment of the present application.

Referring to FIG. 18, a plurality of short PUCCHs conflict with first time-domain resources, respectively. The first time-domain resource is a time-domain resource, having a mapping type of type A, of a PUCCH, and the length of each of the plurality of short PUCCHs is less than or equal to the length of a first time-domain resource.

Figure 19:
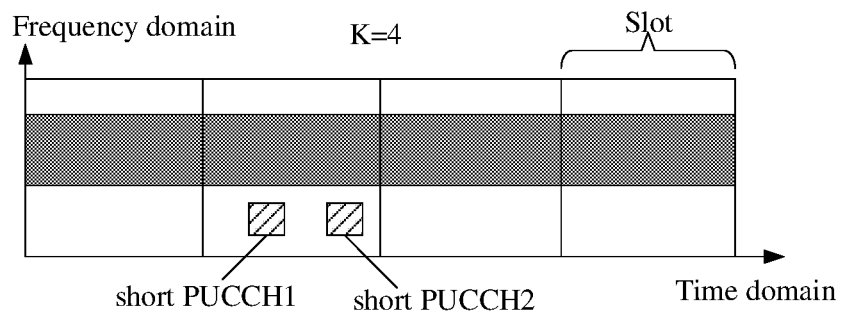
FIG. 19 is a seventeenth schematic diagram of an applied scenario of the UCI transmission method provided in an embodiment of the present application.

Referring to FIG. 19, a plurality of short PUCCHs conflict with a same first time-domain resource. The first time-domain resource is a time-domain resource, having a mapping type of type A, of a PUCCH, and the length of each of the plurality of short PUCCHs is less than or equal to the length of a first time-domain resource.

Figure 20:
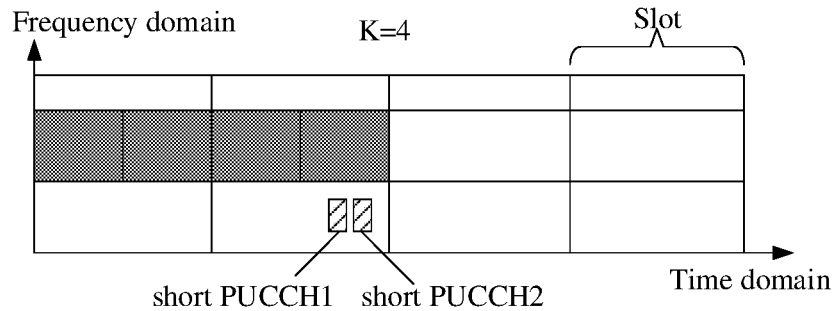
FIG. 20 is an eighteenth schematic diagram of an applied scenario of the UCI transmission method provided in an embodiment of the present application.

Referring to FIG. 20, a plurality of short PUCCHs conflict with a same first time-domain resource. The first time-domain resource is a time-domain resource, having a mapping type of type B, of a PUCCH, and the length of each of the plurality of short PUCCHs is less than or equal to the length of a first time-domain resource.

Figure 21:
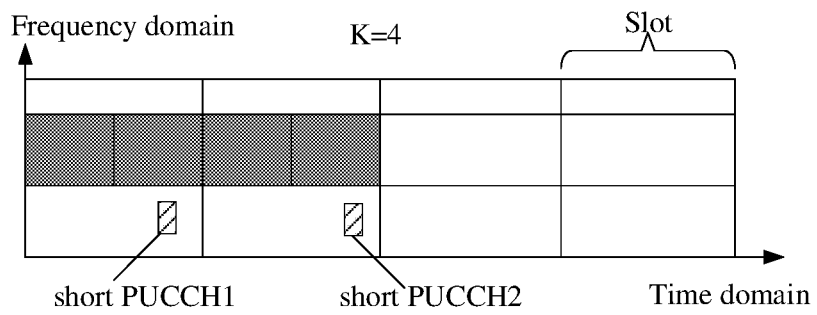
FIG. 21 is a nineteenth schematic diagram of an applied scenario of the UCI transmission method provided in an embodiment of the present application.

Referring to FIG. 21, a plurality of short PUCCHs conflict with first time-domain resources, respectively. The first time-domain resources are time-domain resources, having a mapping type of type B, of a PUCCH, and the length of each of the plurality of short PUCCHs is less than or equal to the length of a first time-domain resource.

Figure 22:
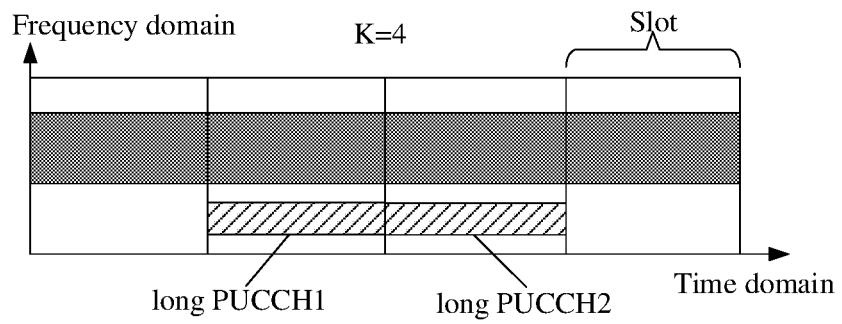
FIG. 22 is a twentieth schematic diagram of an applied scenario of the UCI transmission method provided in an embodiment of the present application.

Referring to FIG. 22, a plurality of long PUCCHs conflict with a same first time-domain resource. The first time-domain resource is a time-domain resource, having a mapping type of type A, of a PUCCH, and the length of each of the plurality of long PUCCHs is less than or equal to the length of a first time-domain resource.

In a first aspect, in the scenarios shown in FIG. 18, FIG. 19, FIG. 20, FIG. 21, and FIG. 22, the embodiments of the present application may transmit the UCI carried on one of the K first time-domain resources in following manners.

4-1-1: transmitting a first data packet carried on first time-domain resources, conflicting with the second time-domain resource, of the K first time-domain resources; wherein the second data packet includes the UCI carried by the plurality of second time-domain resource.

When a first time-domain resource, conflicting with the second time-domain resource, among the K first time-domain resources is one first time-domain resource, specific implementation of transmitting a first data packet carried on first time-domain resources, conflicting with the second time-domain resource, of the K first time-domain resources may be obtained by referring to the specific implementation of 1-1-1 described above; when first time-domain resources, conflicting with the second time-domain resource, among the K first time-domain resources are a plurality of first time-domain resources, specific implementation of transmitting a first data packet carried on first time-domain resources, conflicting with the second time-domain resource, of the K first time-domain resources may be obtained by referring to the specific implementation of 2-1-1 described above.

4-1-2: transmitting a first data packet carried on a first one of the K first time-domain resources, wherein the second data packet includes the UCI carried by the plurality of second time-domain resources.

Specific implementation of transmitting a first data packet carried on a first one of the K first time-domain resources may be obtained by referring to the specific implementation of 1-1-2 described above, and will not be repeated herein.

4-1-3: transmitting a first data packet carried on a last one of the K first time-domain resources, wherein the second data packet includes the UCI carried by the plurality of second time-domain resources.

Specific implementation of transmitting a first data packet carried on a last one of the K first time-domain resources may be obtained by referring to the specific implementation of 1-1-3 described above, and will not be repeated herein.

In a second aspect, in the scenarios shown in FIG. 18, FIG. 19, FIG. 20, FIG. 21, and FIG. 22, the embodiments of the present application may transmit the UCI carried on a plurality of first time-domain resources of the K first time-domain resources in following manners.

4-2-1: transmitting a second data packet carried on a first conflict time-domain resource and a second conflict time-domain resource; wherein the second data packet includes the UCI carried by the plurality of second time-domain resource; the first conflict time-domain resource is a first one, conflicting with the second time-domain resource, among the K first time-domain resource, and the second conflict time-domain resource includes a first time-domain resource, after the first conflict time-domain resource, among the K first time-domain resources.

Specific implementation of transmitting a second data packet carried on a first conflict time-domain resource and a second conflict time-domain resource may be obtained by referring to the specific implementation of 1-2-1 described above, and will not be repeated herein.

4-2-2: transmitting a second data packet carried on first time-domain resources, supporting carrying the UCI, of the K first time-domain resources, wherein the second data packet includes the UCI carried by the plurality of second time-domain resources; the first time-domain resources, supporting carrying the UCI, of the K first time-domain resources, include a plurality of first time-domain resources.

Specific implementation of transmitting a second data packet carried on first time-domain resources, supporting carrying the UCI, of the K first time-domain resources may be obtained by referring to the specific implementation of 1-2-2 described above, and will not be repeated herein.

4-2-3: transmitting a second data packet carried on each of the K first time-domain resources.

Specific implementation of transmitting a second data packet carried on each of the K first time-domain resources may be obtained by referring to the specific implementation of 1-2-3 described above, and will not be repeated herein.

In a third aspect, in the scenarios shown in FIG. 18, FIG. 19, FIG. 20, FIG. 21, and FIG. 22, if a data packet carried by each of the K first time-domain resources is the same as data packets carried by others of the K first time-domain resources and M is equal to K, then transmitting the UCI carried on M first time-domain resources of the K first time-domain resources by the mobile terminal in the above embodiments may specifically include 4-3-1.

4-3-1: transmitting, by the mobile terminal, a third data packet carried on M first time-domain resources of the K first time-domain resources; wherein the third data packet is a data packet generated by performing rate-matching on a data packet carried by any one of the first time-domain resources and the UCI, and the second data packet includes the UCI carried by the plurality of second time-domain resources.

Further, in each of the above embodiments, if the UCI is carried on a plurality of first time-domain resources among the K first time-domain resources, the UCI transmission method provided by the embodiments of the present application may further determine whether to transmit an entirety or a part of the UCI in a following manner.

1. If the UCI is only ACK or CSI, determining whether a coding length of the UCI is less than or equal to a threshold length;

if the coding length of the UCI is less than or equal to the threshold length, transmitting the entirety of the UCI carried on a plurality of first time-domain resources among the K first time-domain resources;

if the coding length of the UCI is greater than the threshold length, discarding a part of the coded UCI, and carrying remaining preset bits in the coded UCI on a plurality of first time-domain resources among the K first time-domain resources for transmission; or determining whether the coded UCI can be compressed, and if the coded UCI can be compressed, compressing the coded UCI into preset bits, and transmitting the compressed coded UCI carried on a plurality of first time-domain resources among the K first time-domain resources.

2. If the UCI includes the ACK and the CSI, determining whether a sum of coding lengths of a Hybrid Automatic Repeat Request (HARQ)-ACK and CSI is less than or equal to a threshold length;

if the sum of the coding lengths of the HARQ-ACK and the CSI is less than or equal to the threshold length, transmitting the entirety of the UCI carried on a plurality of first time-domain resources among the K first time-domain resources;

if the sum of the coding lengths of the HARQ-ACK and the CSI is greater than the threshold length, then determining whether the coding length of the HARQ-ACK is less than or equal to the threshold length;

if the coding length of the HARQ-ACK is less than or equal to the threshold length, discarding the CSI, and transmitting the HARQ-ACK carried on a plurality of first time-domain resources among the K first time-domain resources; discarding the HARQ-ACK, and transmitting the CSI carried on a plurality of first time-domain resources among the K first time-domain resources;

if the coding length of the HARQ-ACK is greater than the threshold length, the discarding the CSI, and bundling the HARQ-ACK carried on a plurality of first time-domain resources among the K first time-domain resources.

Further, in an embodiment of the present application, in a case that at least one of the K first time-domain resources aggregated in the time domain on the uplink data channel conflicts with the second time-domain resource for carrying the UCI on the uplink control channel, the UCI carried on the second time-domain resource of the uplink control channel is discarded.

According to the UCI transmission method provided in an embodiment of the present application, in a case that at least one of the K first time-domain resources aggregated in the time domain on the uplink data channel conflicts with the second time-domain resource on the uplink control channel for carrying Uplink Control Information (UCI), the mobile terminal transmits the UCI carried on the M first time-domain resources among the K first time-domain resources. That is, when a plurality of time-domain resources aggregated in the time domain on the uplink data channel conflicts with a time-domain resource on an uplink control channel for transmitting a UCI in respect of time, the UCI is carried and transmitted over one or more of the K first time-domain resources aggregated in the time domain, thereby the UCI is transmitted by one or more of the K first time-domain resources aggregated in the time domain. Therefore, an embodiment of the present application can ensure normal transmission of the UCI when a time conflict occurs between a plurality of time-domain resources aggregated in the time domain on an uplink data channel and a time-domain resource on an uplink control channel for transmitting the UCI.

Second Embodiment

Figure 23:
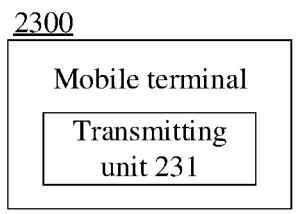
FIG. 23 is a first schematic structural diagram of a mobile terminal provided in an embodiment of the present application.

As shown in FIG. 23, an embodiment of the present application provides a mobile terminal, and the mobile terminal 2300 includes a transmitting unit 231.

The transmitting unit 231 is used for: in a case that at least one first time-domain resource of K first time-domain resources aggregated in a time domain on an uplink data channel conflicts with a second time-domain resource on an uplink control channel for carrying Uplink Control Information (UCI), transmitting the UCI on M first time-domain resources among the K first time-domain resources; K is an integer greater than 1; M is a positive integer less than or equal to K.

Optionally, the M first time-domain resources include: M first time-domain resources of first time-domain resources conflicting with the second time-domain resource; or a first one of the K first time-domain resources; or a last one of the K first time-domain resources; or, M first time-domain resources of first time-domain resources supporting carrying the UCI among the K first time-domain resources; or a first conflict time-domain resource and a second conflict time-domain resource, wherein the first conflict time-domain resource is a first one, conflicting with the second time-domain resource, among the K first time-domain resources, and the second conflict time-domain resource includes a first time-domain resource, after the first conflict time-domain resource, among the K first time-domain resources; or, each of the K first time-domain resources.

Optionally, the first time-domain resources conflicting with the second time-domain resource include a plurality of first time-domain resources. M first time-domain resources of the first time-domain resources conflicting with the second time-domain resources, include: a first one, conflicting with the second time-domain resource, of the K first time-domain resources; or, a last one, conflicting with the second time-domain resource, of the K first time-domain resources; or, all first time-domain resources, conflicting with the second time-domain resource, of the K first time-domain resources.

Optionally, the first time-domain resources supporting carrying the UCI includes a plurality of first time-domain resources. M first time-domain resources of the first time-domain resources, supporting carrying the UCI, of the K first time-domain resources include: a first one, supporting carrying the UCI, of the K first time-domain resources; or, a last one, supporting carrying the UCI, of the K first time-domain resources; or, all first time-domain resources, supporting carrying the UCI, of the K first time-domain resources.

Optionally, the length of the second time-domain resource is less than or equal to the length of a first time-domain resource; or, the length of the second time-domain resource is greater than the length of a first time-domain resource and less than the length of the K first time-domain resources; or, the length of the second time-domain resource is greater than or equal to the length of the K first time-domain resources.

Optionally, the uplink data channel includes a Physical Uplink Shared Channel (PUSCH); the uplink control channel includes a Physical Uplink Control Channel (PUCCH).

Optionally, a data packet carried by each of the K first time-domain resources is the same as a data packet carried by others of the K first time-domain resources; or, each of the K first time-domain resources carries a respective coding segment of the same data packet.

Optionally, the transmitting unit 231 is specifically used for: puncturing data on each of the M first time-domain resources; transmitting the UCI carried on a punctured resource of each of the M first time-domain resources.

Optionally, M is greater than 1; the transmitting unit 231 is specifically used for transmitting the UCI by repeatedly carrying the UCI on a punctured resource of each of the M first time-domain resources.

Optionally, M is greater than 1; the transmitting unit 231 is specifically used for dividing coded bits of the UCI into M coding segments; transmitting a coding segment on a punctured resource of one of the M first time-domain resources.

Optionally, a data packet carried by each of the K first time-domain resources is the same as a data packet carried by others of the K first time-domain resources and M is equal to K; the transmitting unit 231 is specifically used for transmitting a first data packet carried on M first time-domain resources among the K first time-domain resources, wherein the first data packet is a data packet generated by performing rate-matching on a data packet carried by any one of the first time-domain resources and the UCI.

Optionally, a plurality of second time-domain resources conflict with the K first time-domain resources, each second time-domain resource of the plurality of second time-domain resources is used to carry a UCI; the transmitting unit 231 is specifically used for transmitting a second data packet on M first time-domain resources among the K first time-domain resources, wherein the second data packet includes a UCI carried by the plurality of second time-domain resources.

Optionally, each of the K first time-domain resources is a slot; or, each of the K first time-domain resources is a symbol; or, each of the K first time-domain resources is P consecutive symbols, wherein P is an integer greater than 1.

Optionally, the second time-domain resource is a time-domain resource carrying a short PUCCH; or, the second time-domain resource is a time-domain resource carrying a long PUCCH.

In a case that at least one of the K first time-domain resources aggregated in the time domain on the uplink data channel conflicts with the second time-domain resource on the uplink control channel for carrying Uplink Control Information (UCI), the mobile terminal provided in an embodiment of the present application transmits the UCI carried on the M first time-domain resources among the K first time-domain resources using the transmitting unit. That is, when a plurality of time-domain resources aggregated in the time domain on the uplink data channel conflicts with a time-domain resource on an uplink control channel for transmitting a UCI in respect of time, the UCI is carried and transmitted over one or more of the K first time-domain resources aggregated in the time domain, thereby the UCI is transmitted by one or more of the K first time-domain resources aggregated in the time domain. Therefore, an embodiment of the present application can ensure normal transmission of the UCI when a time conflict occurs between a plurality of time-domain resources aggregated in the time domain on an uplink data channel and a time-domain resource on an uplink control channel for transmitting the UCI.

Third Embodiment

Figure 24:
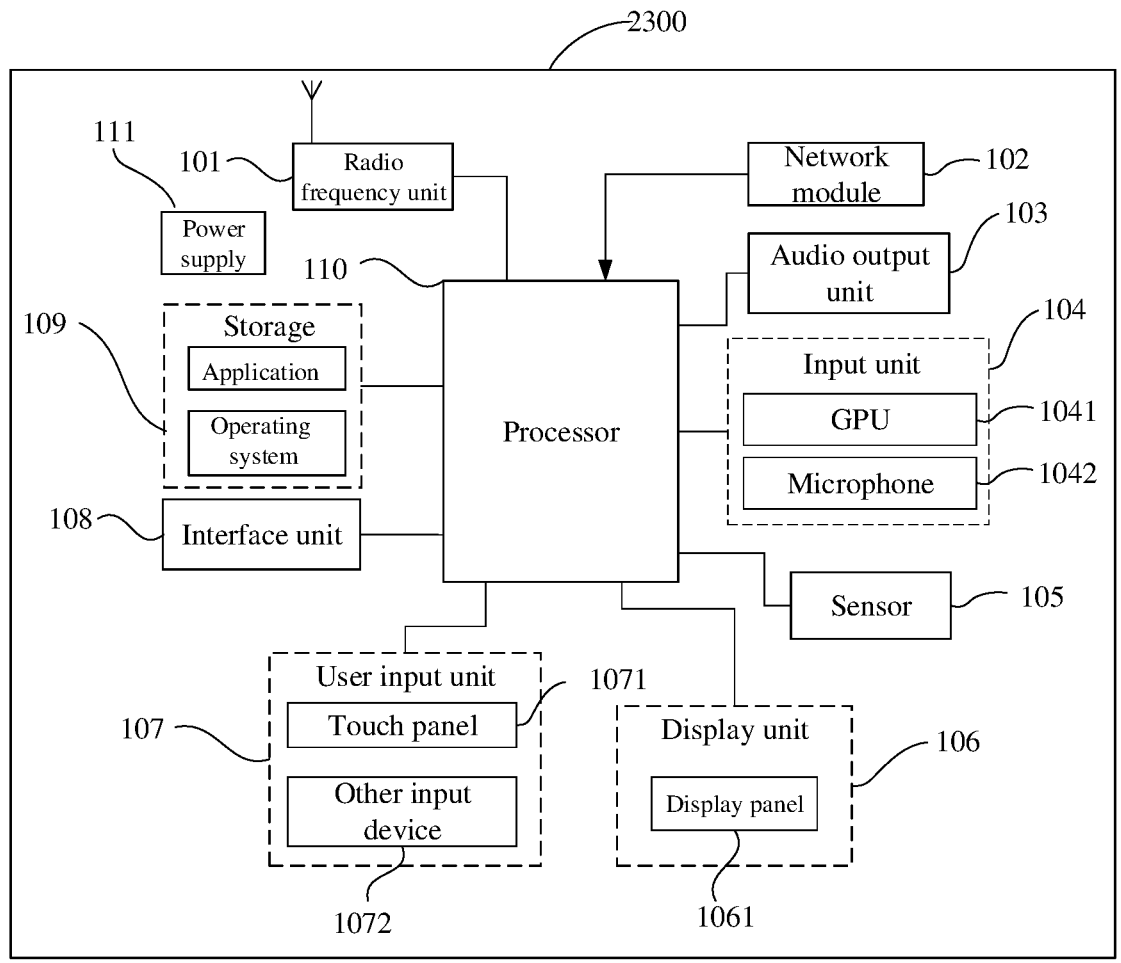
FIG. 24 is a second schematic structural diagram of a mobile terminal provided in an embodiment of the present application.

FIG. 24 is a schematic diagram of a hardware structure of a mobile terminal for implementing various embodiments of the present application. The terminal 2300 includes, but is not limited to, a radio frequency unit 101, a network module 102, an audio output unit 103, an input unit 104, a sensor 105, a display unit 106, a user input unit 107, an interface unit 108, a storage 109, a processor 110, and a power supply 111, and other components. Those skilled in the art will appreciate that a structure of the mobile terminal shown in FIG. 24 does not constitute a limitation of the mobile terminal. The mobile terminal may include more or fewer components than illustrated, or combine certain components, or different component arrangements. In an embodiment of the present application, the terminal includes, but is not limited to, a mobile phone, a tablet computer, a notebook computer, a palmtop computer, an in-vehicle terminal, a wearable device, a pedometer, and the like.

The radio frequency unit 101 is used for: in a case that at least one first time-domain resource of K first time-domain resources aggregated in a time domain on an uplink data channel conflicts with a second time-domain resource on an uplink control channel for carrying Uplink Control Information (UCI), transmitting the UCI on M first time-domain resources among the K first time-domain resources; K is an integer greater than 1; M is a positive integer less than or equal to K.

The mobile terminal may be used for the above steps of the UCI transmission method, and the same technical effects may be achieved, and will not be described herein to avoid repetition.

It should be understood that, in the embodiment of the present application, the radio frequency unit 101 may be used for receiving and transmitting signals in processes of transmitting and receiving information or talking. Specifically, after the radio frequency unit 101 receives downlink data from the base station, and the downlink data is transferred by the radio frequency unit 101 to the processor 110 for processing; and additionally the radio frequency unit 101 sends uplink data to a base station. Generally, the radio frequency unit 101 includes, but is not limited to, an antenna, at least one amplifier, a transceiver, a coupler, a low noise amplifier, a duplexer, and the like. In addition, the radio frequency unit 101 may also communicate with a network and other devices through a wireless communication system.

The mobile terminal provides a wireless broadband internet access to a user through the network module 102, such as helping the user to send and receive emails, browse web pages, access streaming media, and the like.

The audio output unit 103 may convert audio data received by the radio frequency unit 101 or the network module 102 or stored in the storage 109 into an audio signal and output the audio signal as sound. The audio output unit 103 may also provide audio output (e.g., a call signal reception sound, a message reception sound, etc.) related to a specific function performed by the mobile terminal 2300. The audio output unit 103 includes a speaker, a buzzer, a receiver, and the like.

The input unit 104 is used to receive an audio or video signal. The input unit 104 may include a Graphics Processing Unit (GPU) 1041 and a microphone 1042. The graphics processing unit 1041 processes image data of a still picture or a video obtained by an image capturing device such as a camera in a video capturing mode or an image capturing mode. The processed image frame may be displayed on the display unit 106. Image frames processed by the graphics processing unit 1041 may be stored in the storage 1090 (or other storage media) or sent via the radio frequency unit 101 or the network module 102. The microphone 1042 may receive sound and be able to process such sound into audio data. The processed audio data may be converted, in a case of a telephone call mode, into a format output that may be sent to a mobile communication base station via the radio frequency unit 101.

The mobile terminal 2300 also includes at least one sensor 105, such as a light sensor, a motion sensor, and other sensors. In particular, the light sensor includes an ambient light sensor and a proximity sensor, wherein the ambient light sensor may adjust brightness of the display panel 1061 according to brightness of ambient light. The proximity sensor may turn off the display panel 1061 and/or a backlight when the mobile terminal 2300 moves close to the ear. As one type of motion sensor, the accelerometer sensor can detect a value of an acceleration in each direction (generally the three axes directions), and can detect a magnitude and a direction of gravity when being stationary, can be used to recognize a posture of a terminal (such as horizontal-vertical screen switching, a related game, a magnetometer posture calibration), a vibration-recognition related function (such as a pedometer, tapping), and the like. The sensor 105 may further include a fingerprint sensor, a pressure sensor, an iris sensor, a molecular sensor, a gyroscope, a barometer, a hygrometer, a thermometer, an infrared sensor, and the like, which will not be described herein.

The display unit 106 is used to display information inputted by the user or information provided to the user. The display unit 106 may include a display panel 1061 that may be configured in the form of a Liquid Crystal Display (LCD), an Organic Light-Emitting Diode (OLED), or the like.

The user input unit 107 may be used to receive inputted digital or character information and generate a key signal input related to user-setting and function control of a terminal. Specifically, the user input unit 107 includes a touch panel 1071 and other input devices 1072. The touch panel 1071, also referred to as a touch screen, may collect a touch operation (e.g., an operation of a user using any suitable object or accessory, such as a finger, stylus, or the like, on or near the touch panel 1071) of the user on or near the touch panel 1071. The touch panel 1071 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 110, and receives and executes commands from the processor 110. In addition, the touch panel 1071 may be implemented in various types such as a resistance type, a capacitance type, an infrared ray, and a surface acoustic wave. The user input unit 107 may also include other input devices 1072 in addition to the touch panel 1071. Specifically, the other input devices 1072 may include, but are not limited to, a physical keyboard, function keys (such as volume control keys, switch keys, etc.), a trackball, a mouse, and a joystick, which will not be described herein.

Further, the touch panel 1071 may be overlaid on the display panel 1061, and after the touch panel 1071 detects a touch operation on or near the touch panel 1071, the touch operation is sent by touch panel 1071 to the processor 110 to determine the type of a touch event. The processor 110 then provides a corresponding visual output on the display panel 1061 according to the type of the touch event. Although in FIG. 24, the touch panel 1071 and the display panel 1061 are two separate components for implementing input and output functions of the mobile terminal, the input and output functions of the mobile terminal in an embodiment may be realized by integrating the touch panel 1071 with the display panel 1061, and the present application is not limited thereto.

The interface unit 108 is an interface in which an external device is connected to the mobile terminal 2300. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 108 may be used to receive input (e.g., data information, power, etc.) from an external device and transmit the received input to one or more elements within the mobile terminal 2300 or may be used to transmit data between the mobile terminal 2300 and the external device.

The storage 109 may be used to store software programs and various types of data. The storage 109 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 109 may include a high speed random access memory, and may also include a non-transitory memory, such as at least one disk storage device, a flash memory device, or other volatile solid state storage device.

The processor 110 is a console of the terminal, connects various parts of the entirety of the mobile terminal using various interfaces and lines, and executes various functions and processes data of the mobile terminal by running or executing software programs and/or modules stored in the storage 109, and by calling data stored in the storage 109, thereby integrally monitoring the terminal. The processor 110 may include one or more processing units; optionally, the processor 110 may integrate an application processor and a modem processor, wherein the application processor primarily processes an operating system, a user interface, an application program, etc. The modem processor mainly handles wireless communication. It will be appreciated that the above-described modem processor may also not be integrated into the processor 110.

The mobile terminal 2300 may also include a power supply 111 (such as a battery) that supplies power to various components, optionally, the power supply 111 may be logically connected to the processor 110 via a power management system. Thus, functions such as charging, discharging, and power consumption management are managed by the power management system.

In addition, the mobile terminal 2300 includes some functional modules (not shown), which will not be described here.

Fourth Embodiment

Figure 25:
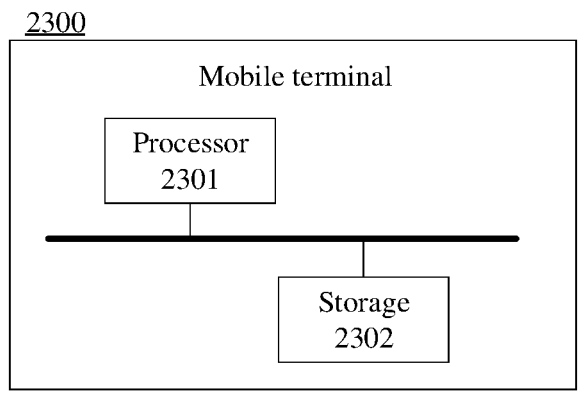
FIG. 25 is a third schematic structural diagram of a mobile terminal provided in an embodiment of the present application.

Referring to FIG. 25, an embodiment of the present application further provides a mobile terminal 2300. The mobile terminal 2300 includes a processor 2301, a storage 2302, a computer program stored on the storage 2302 and executable by the processor 2301, wherein when the computer program is executed by the processor 2301, each process of the UCI transmission method in the above First Embodiment is realized, and the same technical effect can be achieved, and the description thereof is omitted here to avoid repetition.

The embodiments of the present application also provide a computer readable storage medium on which a computer program is stored. When the computer program is executed by a processor, the processor implements various processes of the UCI transmission method, and can achieve the same technical effect. In order to avoid repetition, the various processes will not be repeated herein.

The computer-readable storage medium is, for example, a Read-Only Memory (ROM), a Random Access Memory (RAM), a magnetic disk or an optical disk.

It should be noted that such terms as "include", "comprise", or any other variation thereof are intended to encompass non-exclusive inclusion, so that processes, methods, articles or devices including a series of elements include not only those elements but also other elements not explicitly listed, or may also include elements inherent to such processes, methods, articles, or devices. In the absence of further limitations, if an element is subsequent to a statement as "including one . . . ", coexistence of another identical element in a process, a method, an article, or a device that includes the element is not excluded.

From the above description of the embodiments, it will be apparent to those skilled in the art that methods in the above embodiments may be implemented by means of software plus a common necessary hardware platform, and of course may also be implemented by hardware, but in many cases the former is a better implementation. Based on such an understanding, an essential part or a part contributing the related art in technical solutions of the present disclosure may be embodied in a form of a software product. The computer software product is stored in a storage medium such as an ROM/RAM, a magnetic disk, an optical disk, and includes instructions for enabling a terminal (which may be a mobile phone, a computer, a server, an air conditioner, or a network device or the like) to perform the methods described in various embodiments of the present application.

Some embodiments of the present application have been described above with reference to the accompanying drawings, but the present application is not limited to the specific embodiments described above, which are merely illustrative and not limiting. A person of ordinary skill in the art may, under the teachings of the present application, make many forms within the protection scope of the present application without departing from the spirit of the present application and the scope protected by the claims of the present application.

What is claimed is:

1. An Uplink Control Information (UCI) transmission method, comprising:
in a case that at least one first time-domain resource of K first time-domain resources aggregated in a time domain on an uplink data channel conflicts with a second time-domain resource on an uplink control channel for carrying UCI, transmitting, by a mobile terminal, the UCI on M first time-domain resources of the K first time-domain resources;
wherein K is an integer greater than 1, M is a positive integer less than or equal to K,
transmitting, by the mobile terminal, the UCI on M first time-domain resources of the K first time-domain resources, comprises:
puncturing data on each of the M first time-domain resources;
transmitting the UCI carried on a punctured resource of each of the M first time-domain resources;
or,
data packets carried by different ones of the K first time-domain resources are the same and M is equal to K; transmitting, by the mobile terminal, the UCI on the M first time-domain resources of the K first time-domain resources, comprises:
transmitting, by the mobile terminal, a first data packet carried on the M first time-domain resources of the K first time-domain resources, wherein the first data packet is a data packet generated by performing rate-matching on a data packet carried by any one of the first time-domain resources and the UCI;
or,
a plurality of second time-domain resources conflict with the K first time-domain resources, each second time-domain resource of the plurality of second time-domain resources is used to carry a UCI; transmitting, by the mobile terminal, the UCI on the M first time-domain resources of the K first time-domain resources, comprises:
transmitting, by the mobile terminal, a second data packet on the M first time-domain resources of the K first time-domain resources, wherein the second data packet comprises a UCI carried by the plurality of second time-domain resources.

2. The method according to claim 1, wherein, the M first time-domain resources comprises:
M first time-domain resources of first time-domain resources conflicting with the second time-domain resource; or
a first one of the K first time-domain resources; or
a last one of the K first time-domain resources; or,
M first time-domain resources of first time-domain resources, supporting carrying the UCI, of the K first time-domain resources; or
a first conflict time-domain resource and a second conflict time-domain resource, wherein the first conflict time-domain resource is a first one, conflicting with the second time-domain resource, of the K first time-domain resources, and the second conflict time-domain resource comprises a first time-domain resource, after the first conflict time-domain resource, of the K first time-domain resources; or,
each of the K first time-domain resources.

3. The method according to claim 2, wherein,
the M first time-domain resources of the first time-domain resources conflicting with the second time-domain resources, comprises:
a first one, conflicting with the second time-domain resource, of the K first time-domain resources; or,
a last one, conflicting with the second time-domain resource, of the K first time-domain resources; or,
all first time-domain resources, conflicting with the second time-domain resource, of the K first time-domain resources.

4. The method according to claim 2, wherein,
the M first time-domain resources of the first time-domain resources, supporting carrying the UCI, of the K first time-domain resources comprises:
a first one, supporting carrying the UCI, of the K first time-domain resources; or,
a last one, supporting carrying the UCI, of the K first time-domain resources; or,
all first time-domain resources, supporting carrying the UCI, of the K first time-domain resources.

5. The method according to claim 1, wherein,
data packets carried by different ones of the K first time-domain resources are the same; or,
each of the K first time-domain resources carries a respective coding segment of the same data packet.

6. The method according to claim 1, wherein,
M is greater than 1;
transmitting the UCI carried on the punctured resource of each of the M first time-domain resources, comprises:
   transmitting the UCI by repeatedly carrying the UCI on the punctured resource of each of the M first time-domain resources; or
   dividing coded bits of the UCI into M coding segments; transmitting one of the M coding segments on a punctured resource of one of the M first time-domain resources.

7. The method according to claim 1, wherein,
each of the K first time-domain resources is a slot; or,
each of the K first time-domain resources is a symbol; or,
each of the K first time-domain resources is P consecutive symbols, wherein P is an integer greater than 1.

8. The method according to claim 1, wherein,
the second time-domain resource is a time-domain resource carrying a short Physical Uplink Control Channel (PUCCH); or,
the second time-domain resource is a time-domain resource carrying a long PUCCH.

9. A non-transitory computer-readable storage medium, wherein, a computer program is stored on the computer-readable storage medium, and when the computer program is executed by a processor, the processor implements steps of the UCI transmission method according to claim 1.

10. A mobile terminal, comprising:
a transmitting circuit used for, in a case that at least one first time-domain resource of K first time-domain resources aggregated in a time domain on an uplink data channel conflicts with a second time-domain resource on an uplink control channel for carrying Uplink Control Information (UCI), transmitting the UCI on M first time-domain resources of the K first time-domain resources;
wherein K is an integer greater than 1, M is a positive integer less than or equal to k,
the transmitting circuit is specifically used for:
   puncturing data on each of the M first time-domain resources;
   transmitting the UCI carried on a punctured resource of each of the M first time-domain resources;
or,
data packets carried by different ones of the K first time-domain resources are the same and M is equal to K; the transmitting circuit is specifically used for:
   transmitting a first data packet carried on the M first time-domain resources of the K first time-domain resources, wherein the first data packet is a data packet generated by performing rate-matching on a data packet carried by any one of the first time-domain resources and the UCI;
or,
a plurality of second time-domain resources conflict with the K first time-domain resources, each second time-domain resource of the plurality of second time-domain resources is used to carry a UCI; the transmitting circuit is specifically used for:
   transmitting a second data packet carried on the M first time-domain resources of the K first time-domain resources, wherein the second data packet comprises a UCI carried by the plurality of second time-domain resources.

11. The mobile terminal according to claim 10, wherein,
M is greater than 1;
the transmitting circuit is specifically used for:
   transmitting the UCI by repeatedly carrying the UCI on the punctured resource of each of the M first time-domain resources; or
   dividing coded bits of the UCI into M coding segments; transmitting one of the M coding segments on a punctured resource of one of the M first time-domain resources.

12. The mobile terminal according to claim 10, wherein,
the M first time-domain resources comprises:
   M first time-domain resources of first time-domain resources conflicting with the second time-domain resource; or
   a first one of the K first time-domain resources; or
   a last one of the K first time-domain resources; or,
   M first time-domain resources of first time-domain resources, supporting carrying the UCI, of the K first time-domain resources; or
   a first conflict time-domain resource and a second conflict time-domain resource, wherein the first conflict time-domain resource is a first one, conflicting with the second time-domain resource, of the K first time-domain resources, and the second conflict time-domain resource comprises a first time-domain resource, after the first conflict time-domain resource, of the K first time-domain resources; or,
   each of the K first time-domain resources.

13. The mobile terminal according to claim 12, wherein,
the M first time-domain resources of the first time-domain resources conflicting with the second time-domain resources, comprises:
   a first one, conflicting with the second time-domain resource, of the K first time-domain resources; or,
   a last one, conflicting with the second time-domain resource, of the K first time-domain resources; or,
   all first time-domain resources, conflicting with the second time-domain resource, of the K first time-domain resources.

14. The mobile terminal according to claim 10, wherein,
data packets carried by different ones of the K first time-domain resources are the same; or,
each of the K first time-domain resources carries a respective coding segment of the same data packet.

15. The mobile terminal according to claim 10, wherein,
each of the K first time-domain resources is a slot; or,
each of the K first time-domain resources is a symbol; or,
each of the K first time-domain resources is P consecutive symbols, wherein P is an integer greater than 1.

16. The mobile terminal according to claim 10, wherein,
the second time-domain resource is a time-domain resource carrying a short Physical Uplink Control Channel (PUCCH); or,
the second time-domain resource is a time-domain resource carrying a long PUCCH.

17. A mobile terminal, comprising:
a processor, a storage, and a computer program stored on the storage and executable by the processor, wherein when the computer program is executed by the processor, the processor implements a UCI transmission method, the method comprises following steps:
in a case that at least one first time-domain resource of K first time-domain resources aggregated in a time domain on an uplink data channel conflicts with a second time-domain resource on an uplink control channel for carrying UCI, transmitting, by a mobile terminal, the UCI on M first time-domain resources of the K first time-domain resources;

wherein K is an integer greater than 1, M is a positive integer less than or equal to k, transmitting, by the mobile terminal, the UCI on M first time-domain resources of the K first time-domain resources, comprises:

puncturing data on each of the M first time-domain resources;

transmitting the UCI carried on a punctured resource of each of the M first time-domain resources;

or, data packets carried by different ones of the K first time-domain resources are the same and M is equal to K; transmitting, by the mobile terminal, the UCI on the M first time-domain resources of the K first time-domain resources, comprises:

transmitting, by the mobile terminal, a first data packet carried on the M first time-domain resources of the K first time-domain resources, wherein the first data packet is a data packet generated by performing rate-matching on a data packet carried by any one of the first time-domain resources and the UCI;

or, a plurality of second time-domain resources conflict with the K first time-domain resources, each second time-domain resource of the plurality of second time-domain resources is used to carry a UCI; transmitting, by the mobile terminal, the UCI on the M first time-domain resources of the K first time-domain resources, comprises:

transmitting, by the mobile terminal, a second data packet on the M first time-domain resources of the K first time-domain resources, wherein the second data packet comprises a UCI carried by the plurality of second time-domain resources.

18. The mobile terminal according to claim 17, wherein, the M first time-domain resources comprises:

M first time-domain resources of first time-domain resources conflicting with the second time-domain resource; or a first one of the K first time-domain resources; or a last one of the K first time-domain resources; or, M first time-domain resources of first time-domain resources, supporting carrying the UCI, of the K first time-domain resources; or a first conflict time-domain resource and a second conflict time-domain resource, wherein the first conflict time-domain resource is a first one, conflicting with the second time-domain resource, of the K first time-domain resources, and the second conflict time-domain resource comprises a first time-domain resource, after the first conflict time-domain resource, of the K first time-domain resources; or, each of the K first time-domain resources.

19. The mobile terminal according to claim 18, wherein, the M first time-domain resources of the first time-domain resources conflicting with the second time-domain resources, comprises:

a first one, conflicting with the second time-domain resource, of the K first time-domain resources; or, a last one, conflicting with the second time-domain resource, of the K first time-domain resources; or, all first time-domain resources, conflicting with the second time-domain resource, of the K first time-domain resources.

20. The mobile terminal according to claim 17, wherein, data packets carried by different ones of the K first time-domain resources are the same; or, each of the K first time-domain resources carries a respective coding segment of the same data packet.

* * * * *